US006687289B1

United States Patent
Bohley

(12) United States Patent
(10) Patent No.: US 6,687,289 B1
(45) Date of Patent: Feb. 3, 2004

(54) METHOD FOR MEASURING THE ATTENUATION IN DIGITAL TRANSMISSION LINES

(75) Inventor: Rolf Bohley, Reutlingen (DE)

(73) Assignee: Wandel & Goltermann Management Holding GmbH (DE)

( * ) Notice: Subject to any disclaimer, the term of this patent is extended or adjusted under 35 U.S.C. 154(b) by 0 days.

(21) Appl. No.: 09/251,076

(22) Filed: Feb. 16, 1999

(30) Foreign Application Priority Data

Jul. 9, 1998 (EP) .............................................. 98112720

(51) Int. Cl.$^7$ .............................................. H04B 17/00
(52) U.S. Cl. ...................... 375/224; 375/257; 324/533; 324/534; 324/616
(58) Field of Search ................................ 375/224, 257; 324/533, 534, 616, 637, 642; 370/241, 245, 247, 251; 379/90.01; 702/57, 59, 76, 77, 79; 356/73.1

(56) References Cited

U.S. PATENT DOCUMENTS

| | | | | |
|---|---|---|---|---|
| 3,603,990 A | * | 9/1971 | Poirier | 342/21 |
| 3,903,477 A | | 9/1975 | Cronson et al. | 324/642 |
| 4,794,324 A | | 12/1988 | Tracey et al. | |
| 4,924,489 A | * | 5/1990 | Lawrence et al. | 379/22.06 |
| 5,082,368 A | * | 1/1992 | Fuchs et al. | 356/73.1 |
| 5,128,619 A | * | 7/1992 | Bjork et al. | 324/533 |
| 5,187,362 A | * | 2/1993 | Keeble | 250/227.15 |
| 5,530,367 A | * | 6/1996 | Bottman | 324/616 |
| 5,548,222 A | | 8/1996 | Jensen et al. | 324/628 |
| 5,621,517 A | * | 4/1997 | Jezwinski et al. | 356/73.1 |
| 5,633,709 A | | 5/1997 | Ohtaki et al. | 356/73.1 |
| 6,028,661 A | * | 2/2000 | Minami et al. | 356/73.1 |
| 6,049,553 A | * | 4/2000 | Stein | 370/524 |

FOREIGN PATENT DOCUMENTS

DE 2630357 1/1978

* cited by examiner

*Primary Examiner*—Shuwang Liu
(74) *Attorney, Agent, or Firm*—Reed Smith, LLP

(57) ABSTRACT

A method for measuring the attenuation in digital transmission lines between a switching center and a subscriber station, with a first pulse of a known frequency spectrum being sent from the switching center to the transmission line. From the multitude of the reflections received by the switching center in the time domain that pulse is selected which was caused by the total reflection at the end of the line of a certain subscriber station. The frequency spectrum of the selected pulse is determined and from the frequency spectra of the outgoing pulse and the selected received pulse, the attenuation of the transmission line is determined, depending on its frequency. To achieve the extremely high dynamics necessary for this and to obtain a pulse which is free of any overshoot, reflection measuring is carried out selectively in the frequency range and the pulse is calculated per Fourier transformation. In order to reduce pulse widening by dispersion, the pulse in the frequency range is shifted to higher frequencies. The method makes it possible to qualify subscriber stations for new services by measuring the attenuation from the switching center.

1 Claim, 3 Drawing Sheets

METHOD FOR MEASURING THE ATTENUATION IN DIGITAL TRANSMISSION LINES

BACKGROUND OF THE INVENTION

1. Field of the Invention

The present invention relates to a method for measuring the attenuation in digital transmission lines between a switching center and a subscriber station.

2. Description of the Related Art

Increasingly, telecommunications networks are changed over to broader band digital transmission methods. This also applies to the subscriber access area; consequently the telecommunications carriers are already implementing the changeover from analogue voice transmission to ISDN (Integrated Services Digital Network). At the same time, still further methods are being tested under the collective term of xDSL for Digital Subscriber Line (ADSL=Asymmetrical Digital Subscriber Line, HDSL=High bit rate Digital Subscriber Line, VHDSL=Very High bit rate Digital Subscriber Line) with considerably higher bit rates. All these methods suffer from a common problem in that the subscriber access lines in part were constructed many years ago, being originally intended only for transmission of the telephone voice channel. Since on the one hand these lines represents a huge investment and on the other hand it is known from investigations that these lines are also suitable for new transmission methods, albeit with certain restrictions, the network operators are endeavoring to use their existing line network as far as possible. However, this necessitates that prior to changing over, the access line for each subscriber be tested for suitability for the new services. This can happen in various ways. If in a particular case the data of the cable installed (length, characteristics of the cable) is known, then in most cases it can be worked out from this whether the line is suitable for the intended use. If this data is not known, then measuring becomes necessary, where among other characteristics the attenuation must also be measured; a very costly procedure. The reason for this is that usually attenuation measurement is carried out as an end-to-end measurement which requires two measuring instruments (level generator and level-measuring set), one at each end of the line. In addition, a measuring technician needs to go to the customer end of the line which can be very time consuming.

SUMMARY OF THE INVENTION

It is thus the object of the present invention to propose a method which considerably simplifies attenuation measurement when compared to the known method, and which can be carried out from one end of the line.

According to the invention, this object is met by the method of the present invention.

According to the invention a first pulse of a known frequency spectrum is sent from the switching center to the transmission line. From the multitude of the reflections received by the switching center in the time domain that pulse is selected which was caused by the total reflections at the end of the line of a certain subscriber station. Subsequently the frequency spectrum of the selected pulse is determined and from the frequency spectrum of the outgoing pulse and the selected received pulse, the attenuation of the transmission line is calculated, depending on its frequency. According to the invention, attenuation measurement is undertaken as a reflection measurement. This is possible if during measurement, total reflection occurs at the far end and if the line in operation is terminated at both ends with the same impedance. If the frequency spectrum of the pulse sent is precisely known, then, from the spectrum of the reflected pulse, the attenuation of the transmission line depending on the frequency can be calculated. The pulse sent travels along the line from the beginning to the end. In this, the amplitudes of its spectral lines diminish according to the line attenuation. At the end of the line the pulse is reflected, but due to the total reflection, the amplitudes of its spectral lines are not changed. During the subsequent return through the entire transmission line, the pulse experiences the same attenuation as during the outgoing travel. If for a particular frequency the relationship of the amplitudes of the respective spectral lines of the outgoing and returning pulse is formed, then the square of the line attenuation at this frequency is obtained. From this it is finally possible to calculate the sought attenuation value by calculating the square root. For practical realization this does however place very high demands on the dynamics of the measuring arrangement.

Attenuation is predominantly caused by line losses. To be sure, to a small extent reflections too, cause line losses which result in several pulses travelling to the line input. From these returning pulses, that pulse must be selected which was caused by the total reflection at the end of the line. This is possible if these pulses arrive at the line entry at various points in time, corresponding to their differing run-times. Individual reflection locations must however be spaced far apart so as to remain able to be distinguished at the respective pulse width. Ideally the right pulse is selected by an experienced measuring technician who can see the complete reflection image on screen. However, for the less experienced operator or for automatic measurements, evaluation can also take place entirely by a control computer.

In the case of low frequencies, the wave impedance of the line is complex. During reflection in this complex impedance, the phase angle is rotated to a different extent with different frequencies and as a result the pulse is considerably widened. A particularly interfering reflection occurs at the beginning of the line because the respective pulse is not attenuated by the transmission line. This pulse becomes so wide that it covers the significantly smaller pulse from the reflection at the end of the transmission line. In order to counteract this, according to a preferred embodiment, the frequency range of the pulse is shifted to higher frequencies, if possible far enough for the wave impedance of the line in this frequency range to be almost real. This shift is tantamount to modulation of a carrier with the pulse. This method is limited in that on the one hand line attenuation increases as the frequency increases so that the useful signal is gradually diminishing; and on the other hand in that the frequency at which attenuation is to be measured must also be within the spectrum of the pulse.

According to this preferred embodiment, the first pulse is sent through the transmission line in the shape of individual sine-shaped signals whose frequency has previously been determined from the frequency spectrum of the first pulse, and the reflections in the time domain are determined by inverse Fourier transformation of the frequency spectrum of these reflections. In this way the pulse spectrum can be selected as freely as possible and in spite of a low signal voltage, a very large pulse can be obtained. The spectral lines of the pulse are transmitted in sequence in the shape of sine-shaped permanent signals, and the pulse is generated mathematically by inverse Fourier transformation of its frequency spectrum in the frequency range. The pulse shape is determined by the choice of window function. Although the individual frequencies are applied to the line only at voltages of a few volts, the voltage of the total pulse is for example 100 V. This method is basically known as frequency range reflectometer; it is largely unsusceptible to pulse-shaped interferences on the line.

In contrast to the classical attenuation measurement in the frequency range, in which at the end of the line the superimposition of the main wave and all further waves generated by multiple reflection, is measured; in the case of measurement with the pulse reflection method only the main wave is acquired. Furthermore, it is not the double attenuation ("double" in the sense of a logarithmic attenuation constant) of the transmission line that is measured but the attenuation of a transmission line of the same type, which is twice as long. Due to the attenuation portion caused by mismatch, which is thus independent of the line length, a further measuring error results. However, this error is relatively small.

According to a further embodiment of the method, when using a known measuring setup and when specifying exactly defined frequency relationships, an exact attenuation measurement for the application range is made possible. In this, during selective reflection measurement in the frequency range, additionally the pulse in the frequency range is shifted to higher frequencies in order to reduce pulse widening by dispersion.

The method according to the invention thus makes it possible to qualify subscriber connection lines for new services (ISDN, ADSL, etc.) by measuring the attenuation from the switching center. This results in considerable time savings in the case of extended lines; in the case of star-shaped networks, measuring can be automated with only one measuring instrument and a selector switch. Consequently, this method for measuring the attenuation can be carried out at considerably lower costs. It is sufficiently accurate for the intended field of application, but it is inaccurate in the case of lines which are extremely low in attenuation and in addition highly mismatched.

Below, the invention is explained in more detail by means of the accompanying drawings, as follows:

DETAILED DESCRIPTION OF PREFERRED EMBODIMENT(S)

Figure 1:
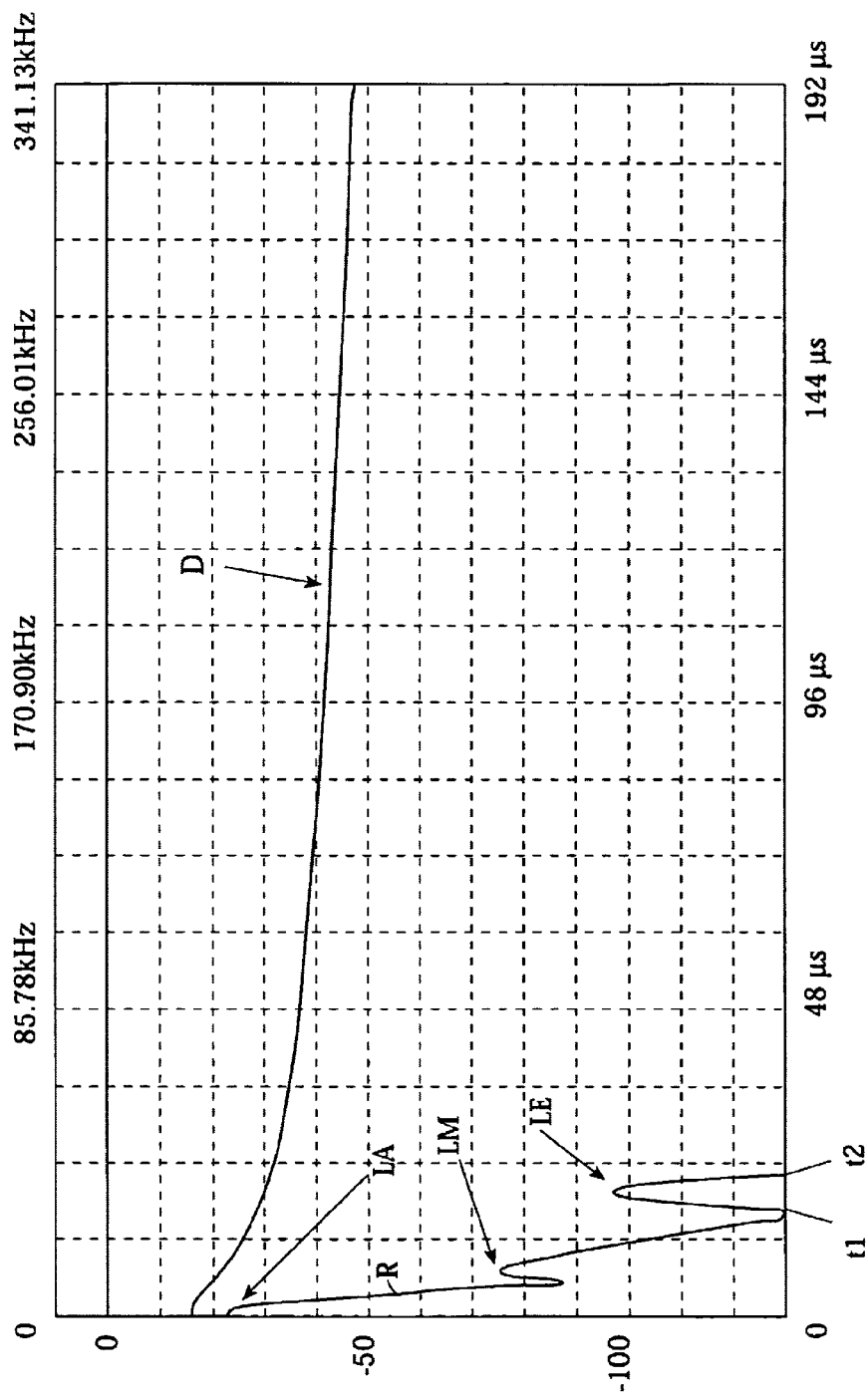
FIG. 1 is a typical representation of the reflections in the time domain with a reflection curve and an attenuation curve.

In FIG. 1 the reflection curve R is shown over time. In order to determine line attenuation, the reflection LE at the end of the line is transformed into the frequency range in the time interval T1 to T2 and the frequency spectrum is offset against the spectrum of the transmission pulse. In addition, this Fig. shows the reflection LA at the beginning of the line and the reflection LM in the middle of the line. Also shown in this Fig. is the attenuation curve D, depending on the frequency shown at the upper margin of the image, from the reflection at the end of the line, as a result of this offsetting calculation. The reflection curve R and the attenuation curve D share a common level-scale of 10 dB/gradation.

Figure 2:
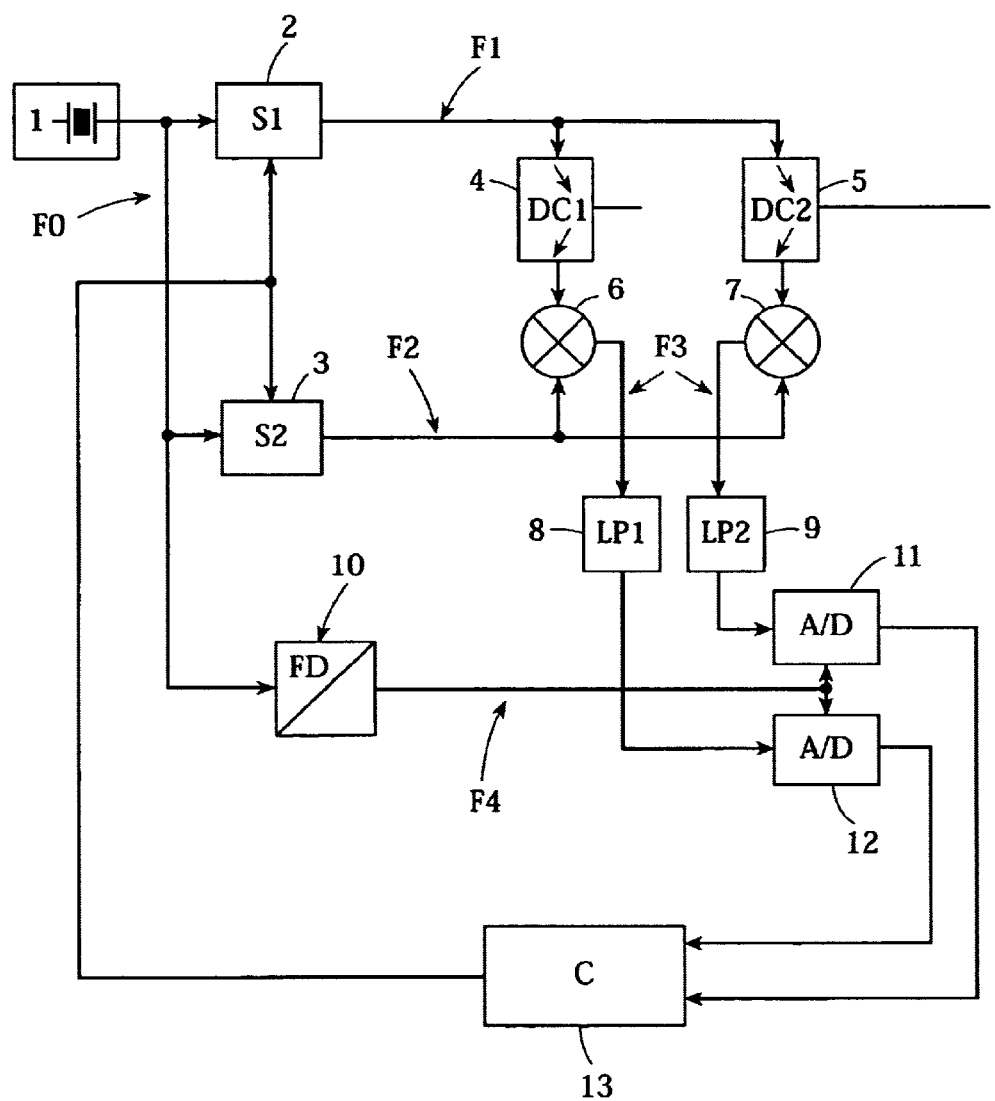
FIG. 2 is the principal representation of a vectorial network analyzer.

In order to carry out measurements in the frequency range, a measuring setup with high measuring dynamics and accuracy is required. This can be shown by the following example: If at a certain frequency we assume a line attenuation of 50 dB, then the reflected signal is attenuated by 100 dB in relation to the transmission signal. Thus the object consists of processing two signals of the same frequency in 100 dB level difference. If the interference distance for the reflected signal is to be 20 dB, then interferences must be spaced apart from the transmission signal at 120 dB. In principle, any vectorial network analyzer of adequate accuracy and dynamics is suitable for carrying out attenuation measurements according to the method described above. However, for practical use such instruments are too large and too expensive. A measuring setup which can be realized particularly simply and economically while still meeting the high requirements is described in connection with FIG. 2.

In this measuring setup an oscillator 1 generates a clock-pulse signal of a frequency F0. From this signal a first synthesizer 2 generates a signal of the frequency F1. This signal is fed to two identically constructed directional couplers 4, 5. The first directional coupler 4 is used to generate a reference signal. Its measuring gate is open or briefly closed, thus leading to total reflection. The line to be measured is connected to the measuring gate of the second directional coupler 5. The reflected signals of both directional couplers 4, 5 are fed to the first inputs of the two mixers 6, 7. From the clock-pulse signal of the frequency F0, a second synthesizer 3 generates a signal of the frequency F2 which signal is fed to the second inputs of the two mixers 6, 7. By way of two low passes 8, 9, the output signals of the two mixers 6, 7 are respectively fed to two analogue-digital converters 11, 12 with the frequency F3 which has been influenced by the frequencies F1 and F2. From the signal of the frequency F0 a signal of the frequency F4 is generated by means of a frequency divider 10, with the signal, which serves as a sampling cycle, being fed to both analogue-digital converters 11, 12. Both the processing of the values supplied by the A/D converters 11, 12 and the setting of the synthesizers 2, 3 are carried out by the computer 13. The relationship between the result supplied by the A/D converter 12 allocated to the transmission line, and the result supplied by the A/D converter 11 allocated to the reference gate, is evaluated as a measuring value. In addition, the differences between measurement path and reference path are suppressed by a normalizing and correction procedure (not shown) which is common with network analyzers and which is known to the expert.

The subharmonic sidelines of the useful signal, present in both synthesizers 2, 3, pose a general problem. These sidelines do not impose any significant restrictions in the case of conventional applications in network analyzers, but here they interfere because of the high requirements regarding accuracy. By means of expensive switching concepts as they are for example used in spectrum analyzers, these interference lines can be reduced. By contrast, in the order described herein, due to the special selection of the frequency, the still existing interference lines do not affect the measuring process.

To this effect, starting from the clock-pulse frequency F0, a base frequency F_base is selected which can be derived from F0 by binary division:

$$F\_base = F0/2^a.$$

Since F_base results from entire-line division of F0, it is free of any subharmonic sidelines. The frequency F3 is especially selected in such a way that it results from F_base as a power of the base 2:

$$F3 = F\_base \times 2^c.$$

Only integral multiples of F_base are used as frequencies F1 and F2:

$$F1 = F\_base \times b$$

$$F2 = F\_base \times b + F3 = F\_base \times (b + 2^c).$$

In this way it is ensured that the two signals only comprise sidelines at ±n×F_base. The mixers 6, 7 generate the two sidebands (F2−F1) and (F2+F1). The upper sideband (F1+F2) is suppressed by the low passes 8, 9 as well as by digital filters which are integrated into the A/D converters 11, 12.

The scanning frequency F4 is generated by binary division from F0; it is thus free of any subharmonic sidelines:

$$F4=F0/2^d.$$

Since the relationships between F0 and the three frequencies F_base, F3 and F4 are only formed by powers based on 2, the relationship between F4 and F3 is also a power based on 2, e.g. 4 or 8. In addition the relationship m=F4/F_base is a power of two. The signal of the frequency F3 is scanned m times or multiples based on powers of two of m. In this way it is ensured that after the Fourier transformation, the distance of the frequency lines is exactly F_base. Thus the subharmonic interference frequencies exactly coincide with discrete frequency points. With the exception of those interference lines which after transformation coincide exactly with the useful signal, they do not lead to any influence on the useful signal. Interference lines which after transformation exactly coincide with F3 do lead to a constant level error and phase error, they do not however lead to changeable interference. Their effect in the measuring path and reference path are the same in the first approximation and are thus largely eliminated. For a, b, c and d, any integers may be used, subject to the limitations:

$$a-c-d \geq 4 \text{ and } b<2^{a-1}-2^c.$$

The four values can be freely selected only within these limits. With the measures described it is possible to use synthesizers according to the principle of direct digital synthesis (DDS). In an exemplary embodiment, the following values might be used:

$$F0=25.6 \text{ Mhz}$$

$$F\_base=F0/2^{18}=97.65625 \text{ Hz}$$

$$F3=F\_base\times 2^7=12,500 \text{ Hz}$$

$$F4=F0/2^9=50 \text{ kHz}$$

$$m=F4 \text{ divided by } F\_base=512$$

$$b=25, 75, 125, \ldots$$

Figure 3:
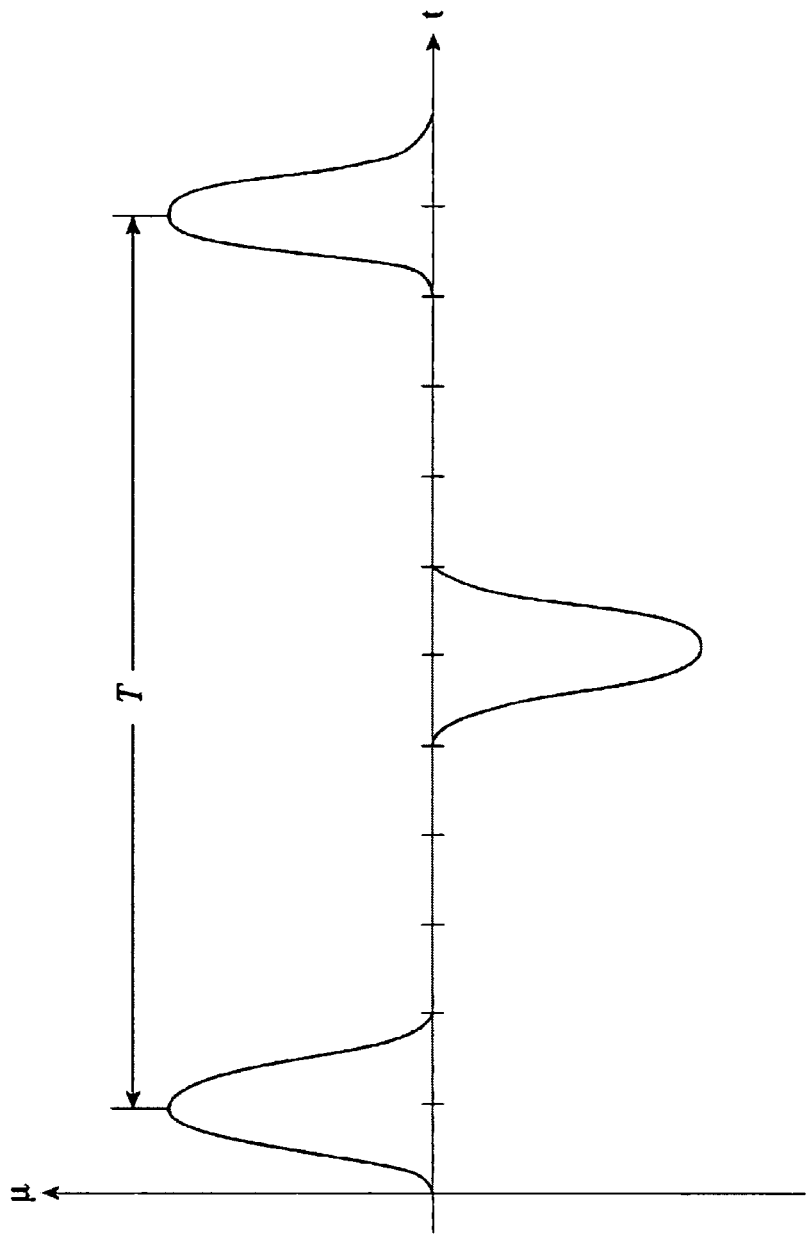
FIG. 3 is a representation of test pulses.

The test pulse (which is imaginary because it is not actually sent in the time domain) is described by its frequency spectrum. The repeat rate which is required for the finite representation of a pulse in a discrete spectrum is selected in such a way that the periodic duration T=1/(F_base×25) applies. Between two such pulses there is a further pulse, equal in shape but inverse, as shown in FIG. 3. As a result of the negative and positive pulses, for practical reasons the even-numbered multiples of the base frequency can be done without (hence b=25, 75, 125, . . . ). In this way the spectrum can be described by the above-named frequencies. The pulse shape determines the amplitudes of the individual spectral lines. In the case of frequencies which correspond to the spectrum of the pulse, in each instance the reflection of the line is selectively measured for amount and phase. After weighting by a suitable window function, the measurable reflection with the mentioned pulse is derived, at first in the frequency range. By means of the inverse Fourier transformation, the reflection in the time domain is obtained. Now the reflection caused by the end of the line is selected and again transformed into the frequency range. While at first the sum was measured as a reflection, now the frequency spectrum of the reflection caused exclusively by the end of the line is obtained. If the level and the level relationships are expressed in a logarithmic scale, then the following applies for each individual frequency Transmission level−reflected level=2×line attenuation+reflection attenuation at the end of the line.

However, total reflection is a requirement for the end of the line, hence reflection attenuation=0. Consequently, the difference between the transmission level and the reflected level is twice the line attenuation.

What is claimed is:

1. A method for measuring the attenuation in digital transmission lines between a switching center and a subscriber station, which comprises sending a first pulse of a known frequency spectrum in the shape of individual sine-shaped signals whose frequency has previously been determined from the frequency spectrum of the first pulse from the switching center to a transmission line;

selecting a pulse from the multitude of the reflections received by the switching center in the time domain which was caused by the total reflection at the end of the line of a certain subscriber station, whereby the reflections in the time domain are determined by inverse Fourier transformation of the frequency spectrum of these reflections;

determining the frequency spectrum of the selected pulse and determining the attenuation of the transmission line depending on the frequency, from the frequency spectrum of the first pulse and the selected received pulse, wherein a clock-pulse signal of a frequency F0 is generated by using a vectorial network analyzer comprising an oscillator;

generating a signal of a frequency F1 by a first synthesizer from the frequency F0, said generated signal being fed to two identically constructed directional couplers, with a first directional coupler being used to generate a reference signal and with the measuring gate of said first directional coupler being open or short circuited, and the transmission line to be measured being connected to a second directional coupler;

feeding the reflected signals of one of the directional couplers to one of two mixers on a first input;

generating a signal of the frequency F2 by a second synthesizer from the frequency F0, which signal is fed to second inputs of the two mixers;

feeding output signals of the two mixers to two low passes at a frequency F3 resulting from the frequencies F1 and F2, with each of said low passes being switched in line with A/D converter;

generating a clock-pulse signal of the frequency F4 by a frequency divider which shares the clock-pulse signal with the frequency F0, which signal is used as a sampling cycle for the A/D converters;

and providing a computer which receives the signals of the A/D converters and adjusts the synthesizers and determines the attenuation from the relationship between the signals supplied by the A/D converter allocated to the transmission line, and the signals of the other A/D converter, whereby, starting from the frequency F0, a base frequency F_base is derived from F0 by binary division;

selecting the frequency F3 in such a way that it results as a power of two from F_base;

using only integral multiples of F_base as frequencies F1 and F2;

generating the frequency F4 by binary division from F0 with F4=4·F3; and sampling the signal of the frequency F3 with the relationship m=F4/F_base or a multiple of it formed by a power of two.

\* \* \* \* \*